United States Patent [19]

Harper

[11] Patent Number: 5,082,920

[45] Date of Patent: Jan. 21, 1992

[54] THERMOSETTING BIS(ISOIMIDE) RESIN COMPOSITIONS

[76] Inventor: John D. Harper, P.O. Box 33, Ste. 369, Long Beach, Calif. 90801

[21] Appl. No.: 586,964

[22] Filed: Sep. 24, 1990

[51] Int. Cl.$^5$ .............................................. C08G 83/00
[52] U.S. Cl. .................................... 528/205; 528/159; 528/162; 528/171; 528/172; 528/176; 528/192; 528/211
[58] Field of Search ............... 528/205, 159, 211, 171, 528/172, 162, 176, 192

[56] References Cited

U.S. PATENT DOCUMENTS 4,732,963  3/1988  Wank et al. .......................... 528/205

Primary Examiner—Harold D. Anderson
Attorney, Agent, or Firm—Thomas A. Schenach

[57] ABSTRACT

Improvements in the thermal stability of bis(isoimide) resins are achieved by the addition of small amounts of trihydroxyaromatic or polyhydroxyaromatic compounds to the partially polymerized bis(isoimide) resin composition.

6 Claims, No Drawings

THERMOSETTING BIS(ISOIMIDE) RESIN COMPOSITIONS

This invention relates to polyimide resins. More particularly, it relates to an improvement in thermosetting resins based on bis(isomaleimides) and dihydric phenols, resulting in higher glass transition temperatures compared to the bis(isomaleimide) resins previously known.

Background of the Invention

Thermosetting resins based upon ethylenically unsaturated N,N bis(imides)

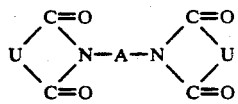

wherein U represents a divalent radical containing a carbon-to-carbon double bond and A represents a divalent radical having at least two carbon atoms are well known in the art. Such bis(imides) are conventionally prepared by addition of two moles of an anhydride such as maleic anhydride to one mole of an aromatic diamine such as 4,4' methylene dianiline. The intermediate reaction product, a bis(maleamic acid)

$$U(COOH)-CO-NH-A-NH-CO-U(COOH)$$

is then dehydrated to form the final cyclic N,N-bis(imide). These bis(imides) may be converted to polyimide resins by heating, as taught by Grundschober and Sambeth, U.S. Pat. No. 3,380,964. Alternately they may be coupled with appropriate multi-functional reactants such as diamines—see for example Bargain and Comber, U.S. Reissue No. 29,316. The exceptional chemical resistance and thermal stability of polyimide resins have found them numerous applications, in for example the manufacture of composites, insulating materials, adhesives, and the like.

In the art, it is customary to carry out a partial polymerization of the bis(imide) composition to form an oligomer or prepolymer. Partial polymerization is carried out by heating the bis(imide) plus any co-reactants to from about 250° F. to 350° F. for from five minutes to an hour. These prepolymers can be dissolved in high boiling solvents such as N-methyl pyrrol-idone or dimethylformamide, and the solutions used to impregnate fibrous materials such as glass cloth or graphite. Removal of the solvent and application of further heat and pressure are then employed to complete the polymerization and form the final cured composite article. The prepolymerization must be carried out to a degree such that the prepolymer will not flow away from the glass cloth or impregnated article once the solvent has been removed. Determining the proper degree of prepolymerization for a given starting material or materials is considered to be within the skill of an ordinary worker in the art.

Recently Wank and Harper, U.S. Pat. No. 4,732,963, have disclosed a new family of thermosetting resins based on the bis(isoimides):

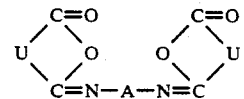

wherein U again represents a divalent radical containing a carbon-to-carbon double bond and A represents a divalent radical having at least two carbon atoms. The bis(isoimides), in combination with dihydric phenols, can be partially polymerized like conventional bis(imides) to form prepolymers. However bis(isoimide) prepolymers are readily soluble and stable in low-boiling solvents such as acetone or methyl ethyl ketone, which are easier to remove than the high boiling solvents required for most bis(imide) systems. Once finally cured however, the bis(isoimide) resins possess the characteristic advantages of the polyimides - exceptional chemical resistance, thermal stability, and the like.

I have now discovered that significant improvement can be achieved in the thermal properties of the bis(isoimide)/dihydric phenol resins without sacrificing the advantageous solubility properties thereof, by adding to the prepolymers small amounts of trihydroxyaromatic and polyhydroxyaromatic compounds selected from condensation products of phenol and formaldehyde (novolacs) and trihydric phenols such as phloroglucinol. By this modification, I am now able to prepare bis(isoimide) resins with glass transition temperatures $T_y$ significantly higher than those of Wank and Harper, while retaining prepolymer solubility in low boiling solvents such as methyl ethyl ketone.

DETAILED DESCRIPTION OF THE INVENTION

The bis(isoimides) used in my invention are prepared by the dehydration of the corresponding maleamic acids, using dicyclohexylcarbodiimide (DCC) or ethyl chloroformate and diethylamine (Sauers, Cotter, and Whelan, Journal of Organic Chemistry, vol. 26(1), p.10 (1961). In the general formula for the bis(isoimides) set out above, the divalent radical U is derived from the ethylenically unsaturated acid anhydride used in the synthesis. Thus, when maleic anhydride is used, U becomes —HC=CH—; when citraconic acid anhydride is used, U is —HC=C(CH$_3$)—; and so on. U may be a part of a cyclic structure, for example, when tetrahydrophthalic anhydride is used, U represents the 1,2-cyclohexene ring. U may contain hetero-atoms other than carbon and hydrogen, provided that they do not give undesirable side reactions under my operating conditions—for example oxygen, nitrogen, sulfur, halogen. U contains from two to twelve carbon atoms. Maleic anhydride, where U contains two carbon atoms, is an especially preferred starting material.

Likewise, in the general formula, the divalent radical A is derived from the primary diamine, $H_2N-A-NH_2$, which is reacted with the anhydride to form the bis(maleamic acid). A contains from two to thirty carbon atoms and may include cyclic and aromatic structures and heteroatoms other than carbon and hydrogen, such as oxygen, nitrogen, sulfur, and halogen, provided that they do not give undesirable side reactions. Aromatic diamines are preferred starting materials for the bis(isoimides) used in my invention, in which case the radial A becomes

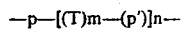

wherein p and p' are ortho-, meta-, or para-phenylene rings (—C₆H₄—) and substituted derivatives thereof, T represents a bridging group connecting said phenylene rings, such as alkylene, substituted alkylene, oxo (—O—), thio (—S—), carbonyl (—CO—), and the like, m is either zero or one, and n is a number from zero to three. Useful alkylene and substituted alkylene bridging groups include methylene ($CH_2$), ethylidene (—HC($CH_3$)—), isopropylidene (—C($CH_3$)$_2$—), bis(trifluoromethyl)methylene (—C($CF_3$)$_2$—), and the like. Especially useful in preparing the bis(isoimides) of my invention are the methylene dianilines, wherein T is —$CH_2$—, p and p' are both phenylene rings, and m and n are both one.

The dihydric phenols employed in combination with the bis(isoimides) to prepare the thermosetting resins of my invention may be represented by the general formula HO—A'—OH, wherein A' is phenylene and substituted derivatives thereof and contains from six to thirty carbon atoms. A' may additionally contain heteroatoms such as oxygen, nitrogen, sulfur, and halogen, provided that they do not give undesirable side reactions.

Particularly useful in my invention are bis(phenols) represented by the general formula HO—p—(T)m—p'—OH, wherein p, p', T and m have the same meanings as defined above. Suitable dihydric phenols useful in my invention include p,p'-dihydroxydiphenyl sulfone, 4,4'-methylene diphenol (which is commonly known by the trade name "Bisphenol F"), 4,4'-isopropylidene diphenol (commonly known as "Bisphenol A"), 4,4'-sec-butylidene diphenol (commonly known as "Bisphenol B"), 4,4'-hexafluoroisopropylidene diphenol, bis(allylphenol), and the tetrabromo derivative of Bisphenol A.

In preparing the thermosetting resin compositions of my invention, the ratio of ethylenically unsaturated bis(isoimide) to dihydric phenol may be varied over a wide range to achieve variations in the final resin product. The molar ratio of bis(isoimide) to dihydric phenol should be between 50:1 and 1:1, and is preferably between two and six moles of bis(isoimide) per mole of dihydric phenol.

The improvement in my invention is achieved by the use of a trihydroxy- or polyhydroxyaromatic modifier compound selected from trihydric phenols such as phloroglucinol (1,3,5-trihydroxybenzene) and novolacs. Novolacs are low molecular weight condensation adducts of phenol and formaldehyde having the formula HO—C₆H₄—CH₂—(HO—C₆H₃—CH₂—)ᵣ—C₆H₄—OH wherein r is a number averaging from 1 to 4. The amount of trihydroxy- or polyhydroxyaromatic compound may be varied, but it should be from 0.2% to 25% of the weight of the dihydric phenol.

In preparing the resin compositions of my invention, the mixture of bis(isoimide) and dihydric phenol is first prepolymerized by heating to from about 250° F. to 350° F. for a period of from about five minutes to an hour. Depending on the choice of raw materials, some modifications in time and temperature of prepolymer preparation may be necessary, as would be evident to the skilled worker. Once a satisfactory prepolymerization has been achieved, the trihydroxy- or polyhydroxyaromatic modifier is added to the prepolymer. Whereas prepolymer and modifier may be intimately mixed in the dry state, it is preferred to dissolve the prepolymer in a suitable solvent such as methyl ethyl ketone, and add the modifier thereto. The solution of prepolymer plus modifier is stable for weeks and may be used to impregnate fibrous materials such as glass cloth. Further polymerization to form the final cured resin composite is accomplished by heating at from about 375° F. to 600° F., usually under pressure, depending on the article being manufactured.

The preparation of the modified bis(isoimide) resin compositions of my invention will now be illustrated by specific examples:

EXAMPLE 1

This is an example of a conventional bis(imide) from the prior art. An intimate mixture of 100 parts by weight bismaleimide resin (from Mitsui Toatsu Inc.) and 20 parts 4,4'-methylene dianiline (MDA) was heated to 300° F. where it melted and became homogeneous. It was then held there for ten minutes to convert the mixture to the prepolymer.

EXAMPLE 2

This was an example of a bis(isoimide) from Wank and Harper. An intimate mixture of 100 parts bis(isoimide) from maleic anhydride and 4,4'-methylene dianiline and 20 parts Bisphenol A was heated to 300° F. where it melted and became homogeneous. It was held there for ten minutes to form a prepolymer.

EXAMPLE 3

This is an example of a bis(isoimide) incorporating the improvement of my invention. An intimate mixture of 100 parts bis(isoimide) from maleic anhydride and 4,4'-methylene dianiline, and 18 parts Bisphenol A was heated to 300° F. to melt it, and then held at that temperature for ten minutes to form the prepolymer. The prepolymer was then dissolved in methyl ethyl ketone, and 2 parts of a novolac having the general structure shown hereinabove with r having an average value of 1.8 were added to the solution.

EXAMPLE 4

By the procedure of Example 2 a prepolymer was prepared from 100 parts bis(isoimide) of maleic anhydride and 4,4'-methylene dianiline, and 20 parts 4,4' dihydroxydiphenol sulfone.

EXAMPLE 5

By the procedure of Example 3, a prepolymer was prepared from 100 parts bis(isoimide) from maleic anhydride and 4,4'-methylene dianiline, and 18 parts dihydroxydiphenol sulfone. The prepolymer was dissolved in methyl ethyl ketone and 2 parts phloroglucinol were added thereto. This resin composition is likewise an example of the improvement of my invention.

All the bis(isoimide) resins were readily soluble in methyl ethyl ketone and the solutions remained fluid after three weeks at room temperature The bis(imide)-methylene dianiline prepolymer was dissolved in dimethylformamide.

Solutions of the five resins were used to impregnate squares of glass cloth, at a loading of approximately 1 part resin to 2 parts glass cloth. The cloth "pre-preg" samples were dried and subjected to a cure cycle of 1 hour at 400° F. under 250 psi pressure in a hydraulic press, followed by a post-cure at 572° F. for three hours at atmospheric pressure. The glass transition temperature, Tg, of the cured resin composites were determined by differential scanning calorimetry (DSC). The results were as follows:

| Example No. | $T_g$ (°C.) | Notes |
| --- | --- | --- |
| 1 | 255 | a |
| 2 | 278 | b |
| 3 | 321 | c |
| 4 | 309 | b |
| 5 | 352 | c |

Notes:
a A bisimide resin from the prior art
b A bis(isomaleimide) from Wank/Harper
c A bis(isomaleimide) of my invention Note that there is a considerable elevation in the glass transition temperature achieved by the addition of small quantities of trihydroxy- and/or polyhydroxy- aromatic modifier compounds to the bis(isomaleimide)/dihydric phenol compositions of Wank and Harper. This elevation of the glass transition temperature indicates superior high temperature properties over the prior art bis(isomide) compositions of Wank and Harper and illustrates the improvement achieved with the compositions of my invention.

The above examples are by way of illustration only, and are not meant to be limiting within the scope of the following claims.

I claim:

1. In thermosetting polymer resin prepared by the reaction of an ethylenically unsaturated bis(isoimide) having the general structure

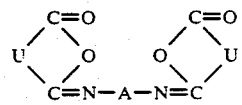

wherein U represents a divalent radical containing a carbon-to-carbon double bond and having from two to twelve carbon atoms, and A represents a divalent radical having from two to thirty carbon atoms, with a dihydric phenol having the general structure

HO—A'—OH wherein A' represents phenylene or substituted derivatives thereof and contains from six to thirty carbon atoms, the molar ratio of said bis(isoimide) to said dihydric phenol being between 50:1 and 1:1, and the reaction temperature being between 250° F. and 600° F., the improvement comprising forming a prepolymer of the bis(isoimide) and the dihydric phenol, adding thereto a trihydroxyaromatic or polyhydroxyaromatic modifier compound selected from the group consisting of trihydric phenols and novolacs, the quantity of trihydroxyaromatic or polyhydroxyaromatic modifier compound being from 0.2% to 25% by weight of the dihydric phenol, and then subjecting the mixture of prepolymer and modifier to further heating the form a cured resin.

2. The resin of claim 1 wherein the bis(isoimide) is prepared from maleic anhydride and methylene dianiline.

3. The resin of claim 2 wherein the dihydric phenol is selected from the group consisting of p,p'-dihydroxydiphenyl sulfone, 4,4'-isopropylidene diphenol, and 4,4'-methylene diphenol.

4. The resin of claim 3 wherein the modifier is phloroglucinol.

5. The resin of claim 3 wherein the modifier is a novolac having the formula HO-$C_6H_4$-$CH_2$-($C_6H_4$-$CH_2$)$_4$-$C_6H_4$-OH wherein r is an average value between 1 and 4.

6. The resin of claim 5 wherein the modifier is a novolac wherein r is 1.8.

* * * * *